(No Model.)

G. WESTINGHOUSE, Jr.
PRESSURE REGULATOR AND CUT-OFF.

No. 324,905. Patented Aug. 25, 1885.

WITNESSES:

INVENTOR.
George Westinghouse Jr.
BY George H. Christy
ATTORNEY.

UNITED STATES PATENT OFFICE.

GEORGE WESTINGHOUSE, JR., OF PITTSBURG, PENNSYLVANIA.

PRESSURE-REGULATOR AND CUT-OFF.

SPECIFICATION forming part of Letters Patent No. 324,905, dated August 25, 1885.

Application filed June 17, 1885. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered certain new and useful Improvements in Pressure Regulators and Cut-Offs, of which improvements the following is a specification.

Figure 1:
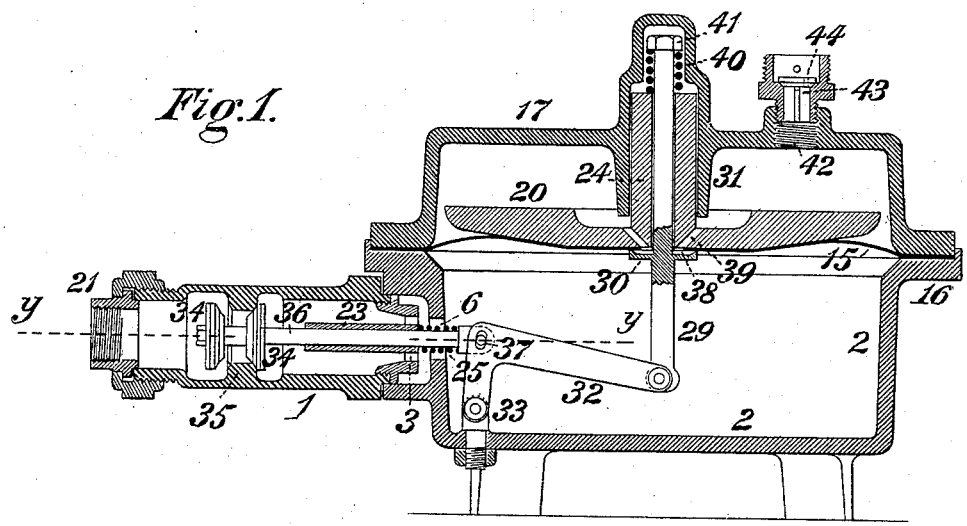
Figure 2:
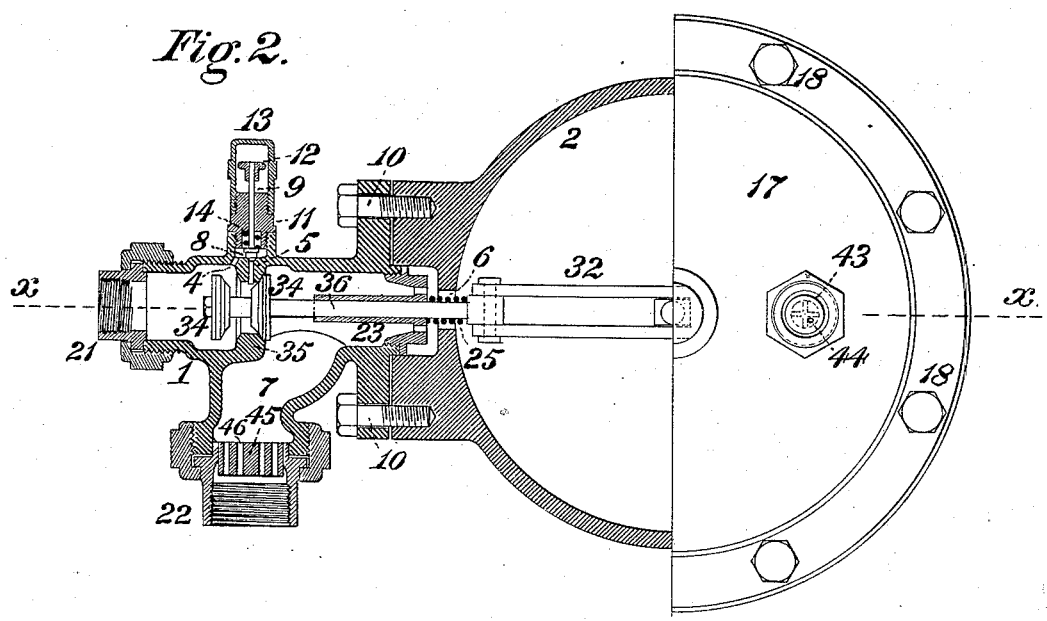

In the accompanying drawings, which make part of this specification, Figure 1 is a vertical central section, at the line $x$ $x$, of Fig. 2, of a pressure-regulator and cut-off embodying my invention; and Fig. 2, a view, partly in plan and partly in horizontal section, at the line $y$ $y$ of Fig. 1.

My present invention is an improvement upon that for which Letters Patent of the United States No. 312,543 were granted and issued to me under date of February 17, 1885; and its objects are to simplify and economize the construction of the apparatus and provide improved facilities for obviating undue vibration of the movable abutment and reducing tendency to breakage of its stem, for maintaining the closure of the regulating-valve during the cessation of supply, and effecting a resumption of supply when required, and for limiting to a determined maximum the quantity of fluid that will be permitted to pass into the delivery-pipe.

To these ends my invention consists in certain novel devices and combinations hereinafter fully set forth.

In the practice of my invention I provide a valve-casing, 1, which is connected by bolts 10, passing through a flange at one of its ends to a pressure-chamber, 2, with which the valve-casing communicates through a series of openings, 3, in a cap extending across its end nearest the chamber, and a passage, 6, in the wall of the pressure-chamber. A flange or nozzle, 21, is formed upon or connected to the end of the valve casing farthest from the pressure-chamber, for the attachment of a pipe leading from a main or other source of higher pressure-supply of gas or other fluid, and a flange or coupling-piece, 22, for the attachment of a delivery-pipe, is connected to a delivery-nozzle, 7, on the side of the valve-casing. A double-beat regulating and cut-off valve, 34, composed of two disks of substantially equal diameters, so as to be in equilibrium of pressure, is secured upon a stem, 36, passing through a long guide, 23, in the valve-chest, into the pressure-chamber 2, the disks of the valve being adapted to seat on opposite sides, respectively, of a partition, 35, extending across the valve-chest between its supply and delivery openings, and being located at such distance apart upon their stem, as to permit, when both are raised equally from their seats, the passage of the maximum quantity of fluid required to be supplied to the delivery-pipe. The pressure-chamber 2 is, as in my Letters Patent No. 312,543, before referred to, fitted with a movable abutment, adapted to be actuated in one direction—to wit, upwardly—by the pressure of fluid entering the chamber through the openings 3 and passage 6, and in the other by a spring or weight, and is composed of a flexible diaphragm, 15, and a gravitating pressure-plate, 20. The diaphragm 15 is secured at and adjacent to its periphery between a flange, 16, projecting around the top of the pressure-chamber 2, and a cap or cover, 17, secured by bolts 18 to the flange. Pressure of fluid entering the chamber 2 through the openings 3 and passage 6 will tend to elevate the diaphragm 15 and pressure-plate 20, acting against the downward tendency of the gravity of the plate and maintaining the abutment in position horizontally or effecting its elevation, respectively, according as it may be sufficient in degree to balance or to overcome the action of gravity. A spring may be employed in lieu of the weight, if desired, to effect the depression of the plate and diaphragm. The regulation of fluid-pressure in the delivery-nozzle 7 and connected delivery-pipe and its exclusion therefrom is effected by the regulating and cut-off valve 34, as actuated by the movements of the diaphragm 15 and pressure-plate 20. A stem, 29, upon which is fixed a plate, 30, adapted to bear against the lower side of the diaphragm 15, passes freely through the diaphragm and pressure-plate and through a long sleeve or boss, 24, projecting centrally from the upper side of the pressure plate and fitting in a central guide-socket, 31, on the cap 17. The stem 29 is caused to follow the movements of the diaphragm and pressure-plate within their range under normal pressure by the resistance of a spring, 40, interposed between the upper end of the boss 24 and a stop-nut, 41, fixed on the end of the stem 29. The lower end of the stem 29 is coupled to the longer arm of a bell-crank lever, 32, which may be formed of two plates, as shown, the shorter arm of which lever is pivoted to a bearing, 33, on the inside of the pressure-chamber 2, adjacent to the point at which the valve-casing 1 is connected thereto. The stem 36 of the regulating and cut-off valve passes freely through the wall of the pressure-chamber 2, and is coupled to the bell crank lever 32 by a pin, 37, fitting slotted holes formed in the lever at the junction of its arms. A helical spring, 25, surrounding the valve-stem 36 and bearing at its ends against a shoulder thereon and against the fixed guide 23, may be inserted for the purpose of compensating for wear and lost motion in the connections of the abutment-stem. It will be seen that both the downward and the upward movements of the diaphragm and pressure-plate will effect the opening and the closure of the regulating and cut-off valve 34, in accordance with and proportionately to variations of pressure in the fluid entering the chamber 2 through the openings 3 and passage 6, the maximum supply of fluid to the delivery-pipe being afforded when both disks of the valve stand at equal distances from their seats, and the same being diminished or wholly cut off as one or the other disk approaches or abuts against its seat. Assuming the disks to be at equal distances from their seats, as above stated, excess of pressure will raise the diaphragm and pressure-plate, and, through the stem 29 and bell-crank lever 32, move the valve-stem 36 to the left, diminishing to the required degree the flow of fluid by the right-hand disk of the valve, and under subsequent diminution of pressure the gravity of the pressure-plate will move the stem 36 to the right and correspondingly increase, as required, the area for the passage of fluid through the opening governed by the right-hand disk. Upon the cessation of fluid-supply, or the diminution thereof below the degree sufficient to support combustion at the burners, the movement of the stem 36 to the right, effected by the gravity of the pressure-plate, will bring the left-hand disk of the valve 34 to its seat, and thereby cut off the supply of fluid to the delivery-nozzle 7 and its connected delivery-pipe.

In order to admit of the renewal of the supply of fluid after having been cut off as above described, a by-pass valve, 8, is fitted to a seat at the outer end of a small passage, 5, leading from the chamber of the valve 8 to the space between the disks of the regulating and cut-off valve 34, said chamber communicating with the supply-nozzle 21 by a corresponding small passage, 4. The valve 8 is secured upon a stem, 9, passing approximately gas tight through a long guide in the cap 11 of its chamber, and having a hand-piece, 12, upon its outer end, and is held to its seat by a spring, 14. The outer end of the valve-stem 9 is inclosed by a tight cap, 13, by the removal of which the by-pass valve may be raised from its seat and held open until a sufficient quantity of fluid has passed through the openings 4 and 5, and the opening governed by the right-hand disk of the valve 34, and thence to the pressure-chamber, to raise the diaphragm and pressure-plate, and thereby to move the left-hand disk from its seat and effect a resumption of the supply, after which the by-pass valve is released and seated by its spring 14, the cap replaced, and the operation of the apparatus continues, as before described.

To enable excess of pressure in the chamber 2 to be relieved if unduly high, a series of openings, 38, is formed in the diaphragm 15, adjacent to its center, said openings registering with corresponding passages 39 in the pressure-plate, and being normally closed to the fluid in the chamber 2 by the plate 30. Upon the existence of an excess of pressure in the chamber 2 the upward movement of the diaphragm 15 will first seat the right-hand disk of the regulating-valve and further upward movement of the stem 29 and plate 30, being prevented by the bearing of said disk against its seat, the continued movement of the diaphragm and plate 20 withdraws the openings 38 from the plate 30, and the fluid in the pressure-chamber will escape through said openings and the passages 39 into the space between the diaphragm and cap 17, from which it may be led through a pipe connected to an opening, 42, in the cap to any suitable point of discharge.

In order to prevent jarring or vibratory motion of the pressure-plate and diaphragm under sudden and frequent variations of pressure, a check-valve, 43, having a minute opening, 44, for the passage of air, is fitted over the opening 42, so as to admit of the constant application of atmospheric pressure above the diaphragm and the release thereof as required by its movements.

For the purpose of limiting the delivery capacity of the regulator to a desired determined maximum, a delivery check-plug, 45, having one or more openings or passages, 46, of proper area to admit of the delivery of the desired maximum quantity of fluid, may be inserted in the delivery-nozzle 22, and the capacity of delivery may be increased or diminished as required by opening more or less of said passages, or by the substitution of a plug having greater or less delivery area.

I claim herein as my invention—

1. The combination of a valve-casing having supply and delivery passages, a regulating and cut-off valve composed of two disks fixed upon a common stem in such relation that either disk is fitted to govern independently of the other, an opening in a partition in the valve-casing between its supply and delivery passages, a by-pass valve governing a passage establishing fluid communication from the space between the disks of the regulating and cut-off valve to the supply-passage of the valve-casing, a pressure-chamber communicating with the valve-casing on the delivery side of the partition, and a movable abutment working in said chamber and coupled to the stem of the regulating and cut-off valve, substantially as set forth.

2. The combination of a pressure-chamber, a flexible diaphragm secured peripherally thereto, a pressure-plate resting on said diaphragm and having a central sleeve or boss fitting a guide-socket in the cap of the pressure-chamber, a stem passing freely through said sleeve or boss and carrying a plate which closes an opening or openings in the diaphragm and pressure-plate, a spring bearing against a shoulder on the stem and against said sleeve or boss, and a valve governing communication between supply and delivery passages in a casing communicating with the pressure-chamber, and coupled to the stem of the diaphragm and pressure-plate, substantially as set forth.

3. The combination of a pressure-chamber, a movable abutment working therein, a cap or cover closing said chamber, a discharge-passage leading out of said cap, and a check-valve governing said passage, and provided with a small opening for the passage of air, substantially as set forth.

4. The combination of a valve-casing, a valve governing communication between supply and delivery passages therein, a movable abutment working in a pressure chamber communicating with the valve-casing and coupled to the stem of said valve, and a perforated delivery check-plug inserted in the delivery-passage of the valve-casing, substantially as set forth.

In testimony whereof I have hereunto set my hand.

GEO. WESTINGHOUSE, JR.

Witnesses:
J. SNOWDEN BELL,
R. H. WHITTLESEY.